J. C. VAN BERKEL.
MEAT HOLDER FOR MEAT CUTTING MACHINES.
APPLICATION FILED NOV. 23, 1915.
1,232,628.
Patented July 10, 1917.
2 SHEETS—SHEET 1.
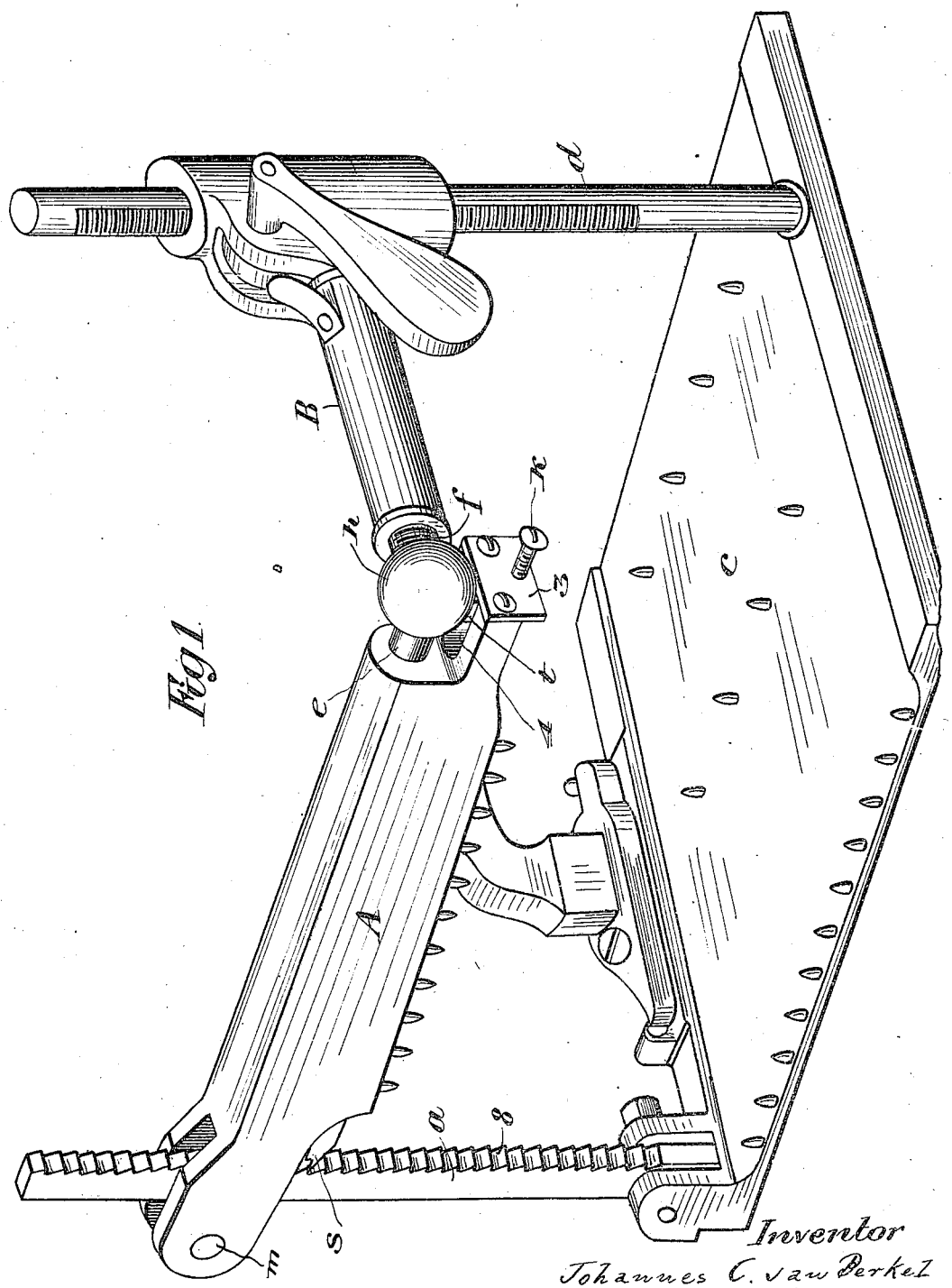

J. C. VAN BERKEL.
MEAT HOLDER FOR MEAT CUTTING MACHINES.
APPLICATION FILED NOV. 23, 1915.
1,232,628.
Patented July 10, 1917.
2 SHEETS—SHEET 2.
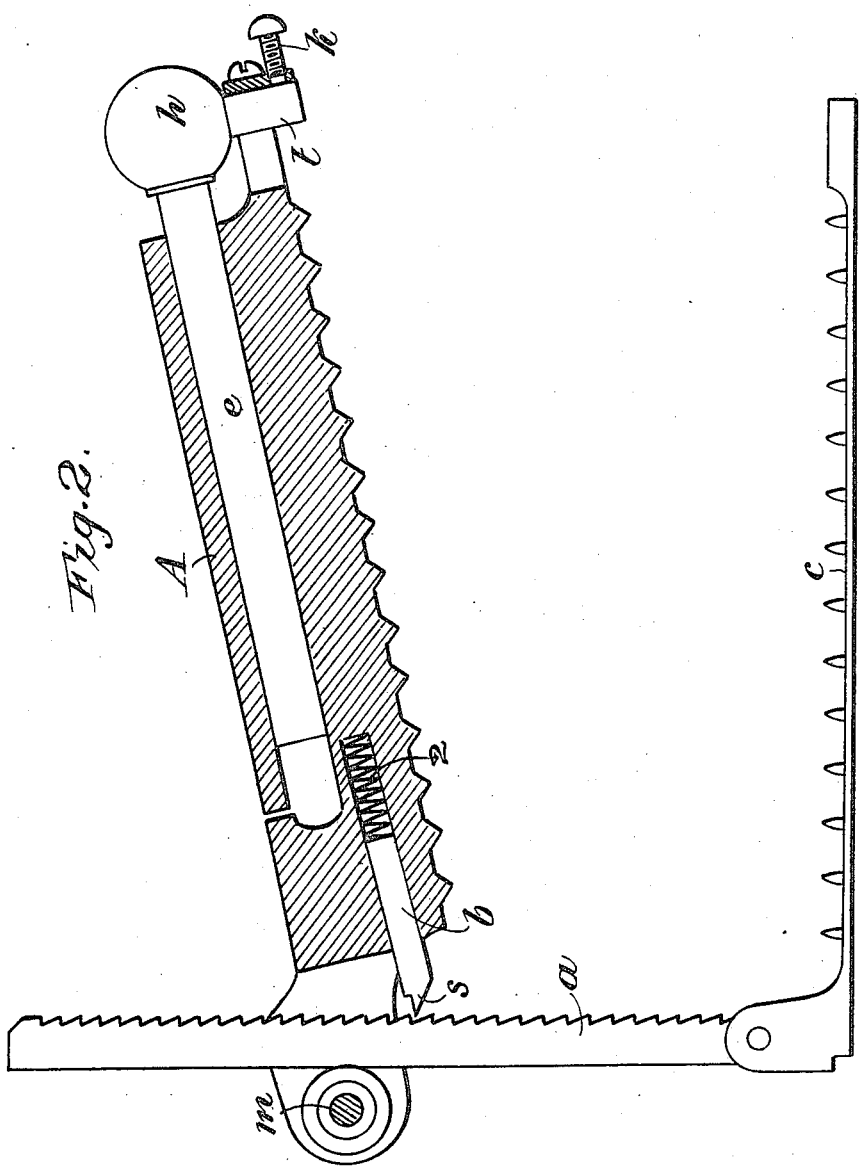
Inventor
Johannes C. van Berkel
By Emil Bouwelcke
Attorney.

UNITED STATES PATENT OFFICE.

JOHANNES CORNELIUS van BERKEL, OF COPENHAGEN, DENMARK.

MEAT-HOLDER FOR MEAT-CUTTING MACHINES.

1,232,628.  Specification of Letters Patent.  Patented July 10, 1917.

Application filed November 23, 1915. Serial No. 62,976.

*To all whom it may concern:*

Be it known that I, JOHANNES CORNELIUS VAN BERKEL, manufacturer, subject of the Kingdom of Holland, residing at Copenhagen, Denmark, at No. 18 Vesterbrogade, have invented certain new and useful Improvements in Meat-Holders for Meat-Cutting Machines, of which the following is a specification.

The invention relates to an improvement in meat holders for meat cutting machines, and the object is to provide means whereby the meat engaging arm may be raised and lowered easily on its standard when the meat is placed upon or removed from the platform.

The invention consists of certain novel features of construction and combinations of parts which will be hereinafter described and pointed out in the claims.

In the accompanying drawings:—

Figure 1 is a perspective view of a meat cutting machine, showing the invention applied; and Fig. 2 is a longitudinal sectional view of the meat holding arm, and showing one of the standards and platform in elevation.

A platform $c$, is provided with a hinged standard $a$, and a stationary standard $d$. The standard $a$ is provided with teeth 8 on its inner face. A meat engaging arm A, is provided with a forked end in which the standard $a$ is received, and a roller $m$ is journaled between the forked terminals and engages the outer or smooth surface of the standard $a$, permitting the arm A, to be moved easily vertically of the standard.

A stem $b$ is mounted in a hole formed in the arm A, and is normally forced outwardly by a spring 2. The stem $b$ is provided with a tooth $s$ on its outer end which is adapted to engage a tooth 8 of the standard $a$ for holding the arm in its locked or meat engaging position.

Mounted in and slidable longitudinally of the arm A, is a bar $e$, which is provided with a head or knob $h$ at its outer end. The inner terminal of the arm A, is slotted, and the slot 4 is closed by a plate 3. A projection $t$ on the head $h$ is received in the slot 4 and a screw $k$ is mounted in the plate 3 for engaging the projection $t$, to limit the outward movement of the bar $e$.

The head $h$ is provided with a screw-threaded shank $f$ on which is screwed an auxiliary arm B. The arm B is mounted to slide on the standard $d$. As the construction of the arm B and its connection with the standard $d$, do not form any part of this invention it is not deemed necessary to describe it further.

Normally the arm A is in a horizontal position, so that the tooth $s$ of the stem $b$ engages one of the teeth 8 of the standard $a$ and locks the arm in its position on the standard. When the meat is placed in the machine the arm B of the meat pinch is grasped by the attendant and lifted, whereby the arm A is brought into the inclined position shown in Fig. 2, thereby releasing the arm from the standard $a$, and allowing it to be moved up or down along said standard to the desired elevation.

In this manner the meat-pinch is adjusted to a height corresponding to the piece of meat to be placed upon the table or platform $c$, and when the meat is in place the arm A is lowered to a horizontal position and brought into engagement with the meat and locked to the standard $a$.

The roller $m$ relieves any friction during the vertical movement of the arm A, and acts as a pivot in oscillating the arm.

I claim:—

1. A meat holder, comprising a platform having a toothed standard thereon, a meat holding arm provided with a forked end, a roller journaled in said forked end and engaging said standard for forming a pivot for said arm, and means carried by the arm adapted to engage the teeth of the standard for holding the arm against movement.

2. A meat holder comprising a platform having a toothed standard thereon, a meat holding arm capable of oscillating movement provided with a forked end, a roller journaled in said forked end and engaging said standard for forming a pivot for said arm, and a spring controlled means carried by the arm for engaging a tooth of the standard for holding the arm in its normal position.

3. The combination of a platform having standards mounted thereon, a meat engaging arm movably mounted on one of the standards and capable of oscillation, means carried by the arm adapted to engage said standard for holding the arm in its operative position, a bar slidably mounted in the arm, an auxiliary arm connected to said bar, said meat engaging arm having a forked inner end, a projection on the bar extending between the forked portions of the arm, and means on the arm for engaging the projection for limiting the movement of the bar.

In testimony whereof I affix my signature in presence of two witnesses.

JOHANNES CORNELIUS VAN BERKEL.

Witnesses:
MARCUS DOLLER,
CHAS. NORTENS.

Copies of this patent may be obtained for five cents each, by addressing the "Commissioner of Patents, Washington, D. C."